US012697723B2

(12) United States Patent
Staufer et al.

(10) Patent No.: US 12,697,723 B2
(45) Date of Patent: Aug. 4, 2026

(54) METHOD AND DEVICE FOR DETERMINING A TIME-OPTIMAL TRAJECTORY

(71) Applicant: STIWA AMS GmbH, Attnang-Puchheim (AT)

(72) Inventors: Peter Staufer, Voecklabruck (AT); Michael Pauditz, Schwanenstadt (AT)

(73) Assignee: STIWA AMS GmbH, Attnang-Puchheim (AT)

( * ) Notice: Subject to any disclaimer, the term of this patent is extended or adjusted under 35 U.S.C. 154(b) by 191 days.

(21) Appl. No.: 18/577,355

(22) PCT Filed: Jul. 7, 2022

(86) PCT No.: PCT/AT2022/060244
§ 371 (c)(1),
(2) Date: Jan. 8, 2024

(87) PCT Pub. No.: WO2023/279132
PCT Pub. Date: Jan. 12, 2023

(65) Prior Publication Data
US 2024/0238974 A1      Jul. 18, 2024

(30) Foreign Application Priority Data

Jul. 9, 2021     (AT) .................................. 50565/2021

(51) Int. Cl.
*B25J 9/16* (2006.01)
(52) U.S. Cl.
CPC ........... *B25J 9/1664* (2013.01); *B25J 9/1653* (2013.01)
(58) Field of Classification Search
CPC .................. B25J 9/1664; B25J 9/1653; G05B 2219/40463; G05B 2219/40466
See application file for complete search history.

(56) References Cited

U.S. PATENT DOCUMENTS

| | | | |
|---|---|---|---|
| 6,216,058 B1 | 4/2001 | Hosek et al. | |
| 6,552,507 B2 * | 4/2003 | Miyazawa | ............. B25J 9/1651 |
| | | | 318/276 |

(Continued)

FOREIGN PATENT DOCUMENTS

| | | | |
|---|---|---|---|
| EP | 3 061 576 A1 | 8/2016 | |
| KR | 20210060036 A * | 5/2021 | ............. B25J 9/1664 |
| WO | 00/73967 A1 | 12/2000 | |

OTHER PUBLICATIONS

Lin, J., et al., "An Efficient and Time-Optimal Trajectory Generation Approach for Waypoints under Kinematic Constraints and Error Bounds," Oct. 2018, IEEE, 2018 IEEE/RSJ International Conference on Intelligent Robots and Systems (IROS), pp. 5869-5876 (Year: 2018).*

(Continued)

*Primary Examiner* — Abby Lin
*Assistant Examiner* — Karston G. Evans
(74) *Attorney, Agent, or Firm* — Collard & Roe, P.C.

(57) ABSTRACT

A method, a device and a computer program product determines a time-optimal trajectory before the start of movement for a movement of an industrial robot, predefined by movement parameters, on a path. The method includes dividing the path into one or more partial paths and carrying out a predetermined number of repetitions of the following steps: calculating a time-optimal trajectory for each of the partial paths, joining the time-optimal trajectories for all partial paths, checking whether predetermined limit values are not exceeded and whether the fastest movement has been found, and varying one or more of the movement parameters.

8 Claims, 12 Drawing Sheets

(56) References Cited

U.S. PATENT DOCUMENTS

Figure 1:
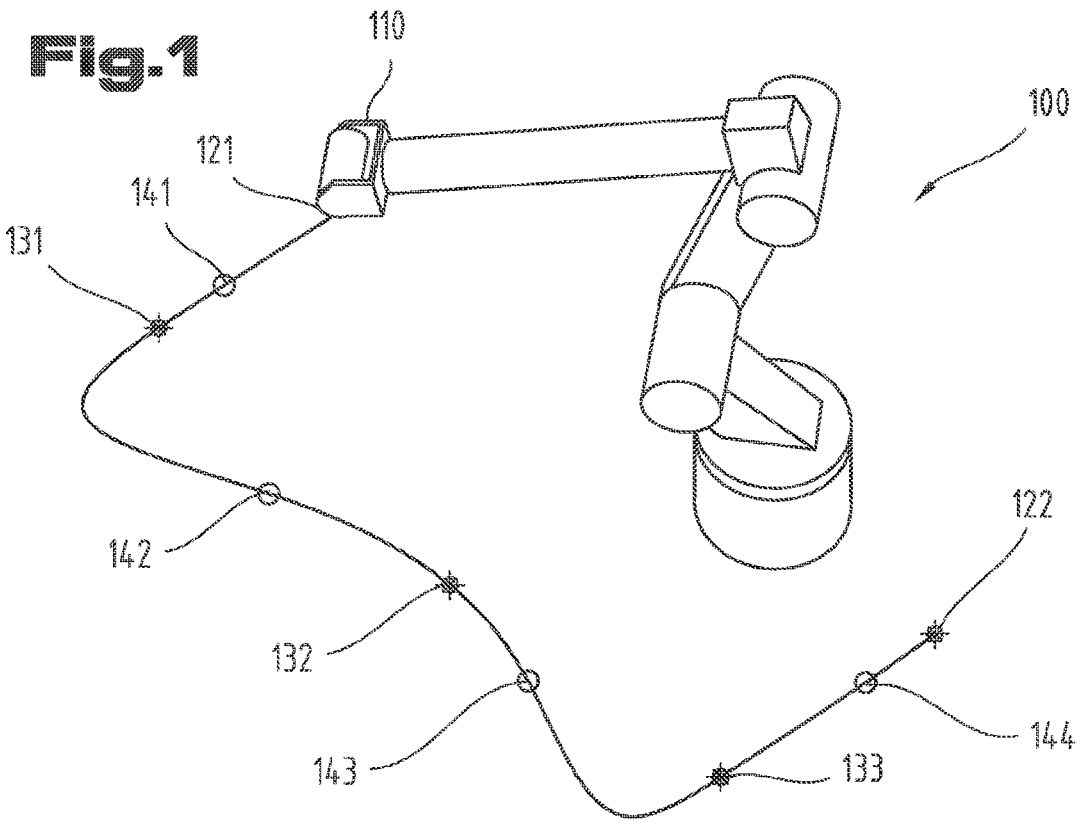

2014/0257558 A1\* 9/2014 Frische ................. B25J 9/1664
                700/245
2016/0252894 A1 9/2016 Kram et al.
2022/0088780 A1\* 3/2022 Abdul-hadi ........... B25J 9/1664
2022/0371195 A1\* 11/2022 Lee ........................ B25J 9/1697

OTHER PUBLICATIONS

International Search Report in PCT/AT2022/060244, mailed Oct. 28, 2022.
Bruno Siciliano et al., "Robotics—Chapters 2-4", in Robotics, London, Springer London, pp. 39-189, Dec. 31, 2009, ISSN:1439-2232, ISBN: 978-1-84628642-1, XP055615186, total of 151 pages.
Luigi Biagiotti et al., "Chapters 3-4", in Trajectory Planning for Automatics Machines and Robots, Springer, pp. 59-219, Nov. 3, 2008, ISBN: 978-3-540-85629-0, XP055972737, total of 161 pages.
Kunz et al., Time-Optimal Trajectory Generation for Path Following with Bounded Acceleration and Velocity, School of Interactive Computing, Center for Robotics and Intelligent Machines Georgia Institute of Technology, (2013), 8 pages.

\* cited by examiner

METHOD AND DEVICE FOR DETERMINING A TIME-OPTIMAL TRAJECTORY

CROSS REFERENCE TO RELATED APPLICATIONS

This application is the National Stage of PCT/AT2022/060244 filed on Jul. 7, 2022, which claims priority under 35 U.S.C. § 119 of Austrian Application No. A 50565/2021 filed on Jul. 9, 2021, the disclosure of which is incorporated by reference. The international application under PCT article 21 (2) was not published in English.

The invention relates to the determination of a time-optimal trajectory for industrial robots in compliance with certain limits.

Industrial robots are categorised into serial and parallel kinematics classes, being available with different numbers of actuators or joints, with rotatory as well as linear configurations. Generally, such robots perform movements such that a characteristic point in the (Cartesian) space of the end effector, usually the tool centre point (TCP), follows a certain path. There are robots which perform various work processes, such as collecting several components from the respective stocks, and robots which always perform the same movement, e.g., processing tasks.

In accordance with standard VDI Guidelines, robots are defined as "[ . . . ] universally deployable movement automata with several axles whose movements regarding movement sequences and routes or angles can be freely (i.e., without mechanical intervention) programmed and where applicable be sensor-guided. They can be equipped with grabbers, tools, or other production means and can perform handling and/or production tasks."

As it is usually desirable to achieve the fastest possible processing for efficiency and economic reasons, it is preferable for them to follow as optimal, i.e. time-optimal, a path as possible.

There are fundamentally two types of paths that can be followed: geometrically spatially defined paths, and geometrically spatially free paths. Generally speaking, the geometrically spatially defined paths are paths such as straights or circular segments which lead from a start to an end point. In addition to the boundary points, the geometric spatial shape of the path is hereby also predefined. Such paths are usually referred to as CP paths, for continuous path.

PTP paths, for point-to-point, represent another type of movement, whereby usually only the start and the target point of the axial coordinates are predefined, and the Cartesian path in the TCP space itself is not. The characteristic of this movement is that the target point can be arrived at as quickly as possible. In addition to the boundary points, PTP paths can also have further grid points that have to be passed through.

Both path types, CP and PTP, are subject to framework conditions such as certain limits, which usually serve to protect the robot and/or the payload or tool. On the one hand, the robot can only move in certain areas, for instance because obstacles or the movement area of another robot are to be avoided, and on the other hand, the robot has mechanical load limits which must not be exceeded. The process itself can also require limits, such as a constant velocity when gluing or welding. However, the precision of the paths to be followed (e.g., milling) determines limits in dynamics.

Methods are known in the prior art which calculate the path on the robot controls on the basis of movement parameters such as velocity and acceleration specifications. The speed of the calculation is thereby usually more important than achieving an optimum result regarding a minimum travel time. On the other hand, methods for calculating CP and PTP paths individually are known.

Conventionally, the path is not fully calculated by the start of the movement in the sense of a full list of all joint angles at every sampling time of the entire path to be followed in order to be able to react (e.g., to a changed position when picking because the piece to be picked varies in its position) to changes in the path points (e.g., at the grid points). This is also referred to as an "online" calculation method. Generally, the advance pointer and program run pointer concept is used. However, this has the significant disadvantage that a very fast method (in terms of performance time) has to be provided for the calculation. That means that suboptimal solutions have to be relied upon in order to provide a result whatsoever within the specified calculation time.

When determining CP paths, usually only the velocity, acceleration, and in special cases the motor torque to be expected (which can be depicted by a dynamic model of the robot), are optimised, such that mathematically the problem remains convex in optimisation function terms, and is thus easier to calculate. Optionally, the path can be "smoothed out" using various filters (mean filter, Bessel filter or similar) of the path parameter $\sigma$ and thus the jerk (derivative of acceleration after time) can be considered to a certain extent and thus limited.

When determining combined PTP paths, i.e. with several grid points to be passed through, or with CP-PTP combinations in general, overlay is conventionally relied upon. All partial stretches are thereby calculated individually (with the boundary condition that the velocity is zero) and interim sections are then inserted (usually further PTP paths) by specifying an area (e.g., using the radius of an overlay sphere) where these sub-stretches can be left. The path is thereby easier to calculate, but is also less optimal. Reference is also made to what are known as fly-by points.

The disadvantages of the methods known in the art are therefore insufficient efficiency of the results and the lack of a time-optimal method in terms of travel time for the determination of such a mixed path.

The object of this invention is to overcome the disadvantages of the prior art and to provide an improved or at least alternative path planning method.

This object is solved by a method and a device according to the claims.

Figure 2:
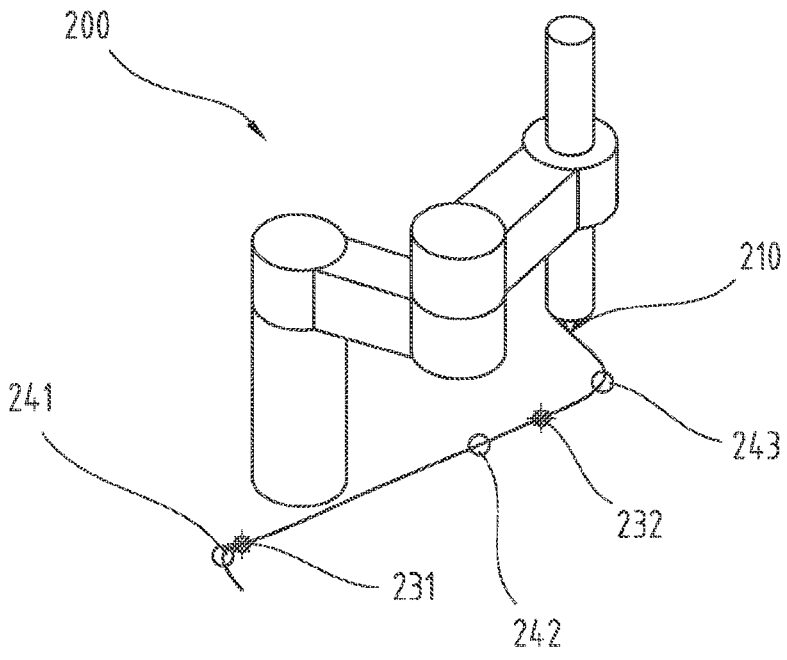
Figure 3:
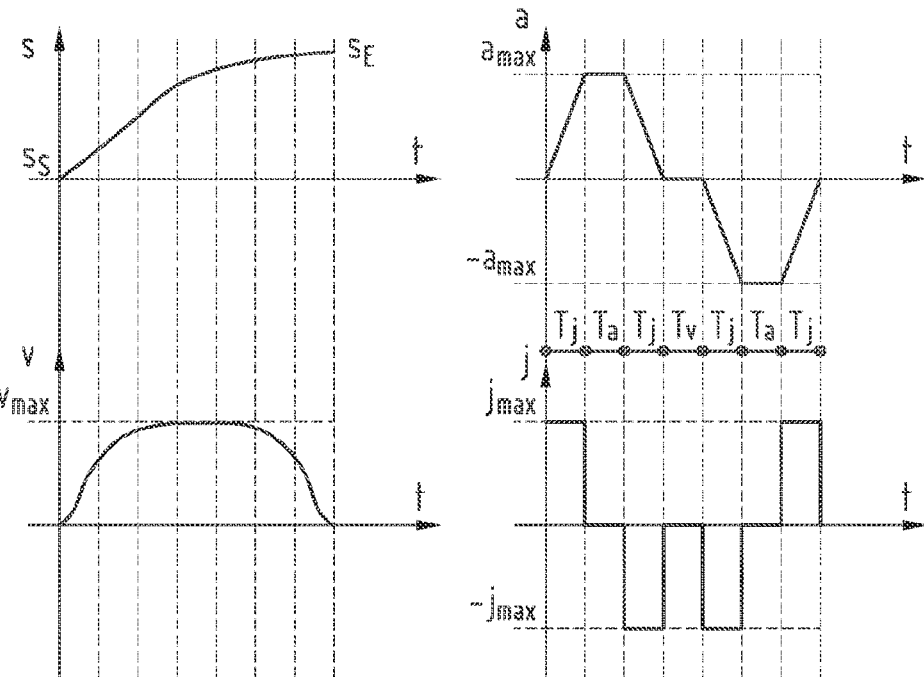
Figure 4:
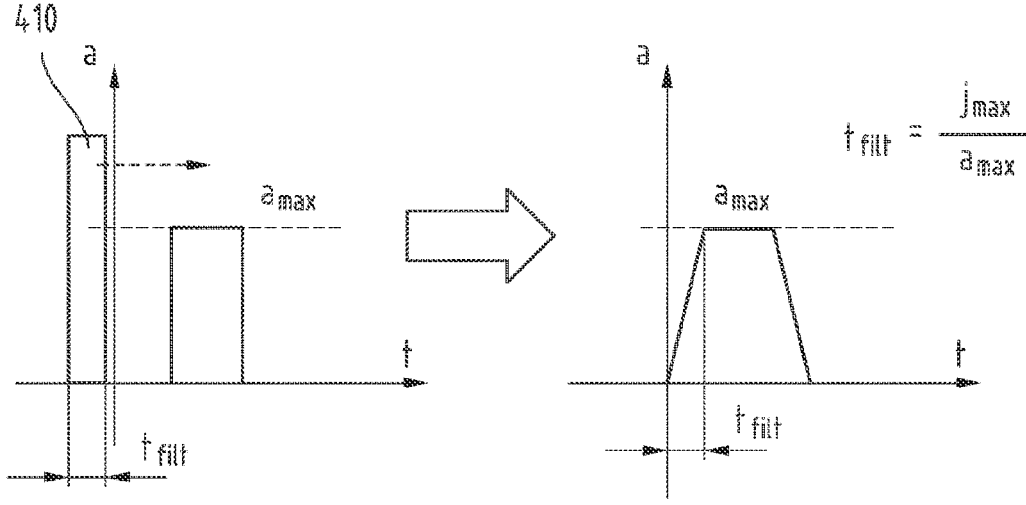
Figure 5A:
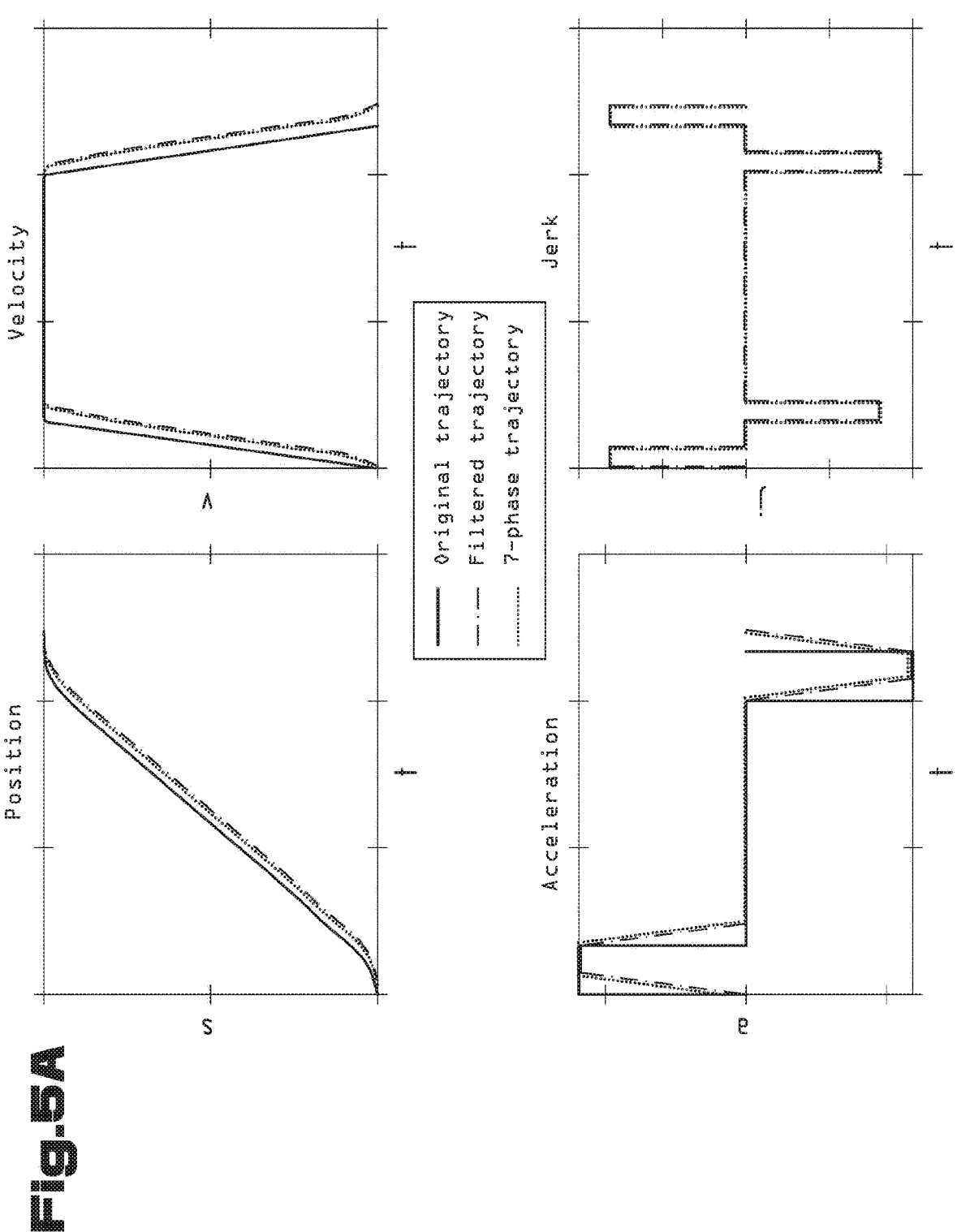
Figure 5B:
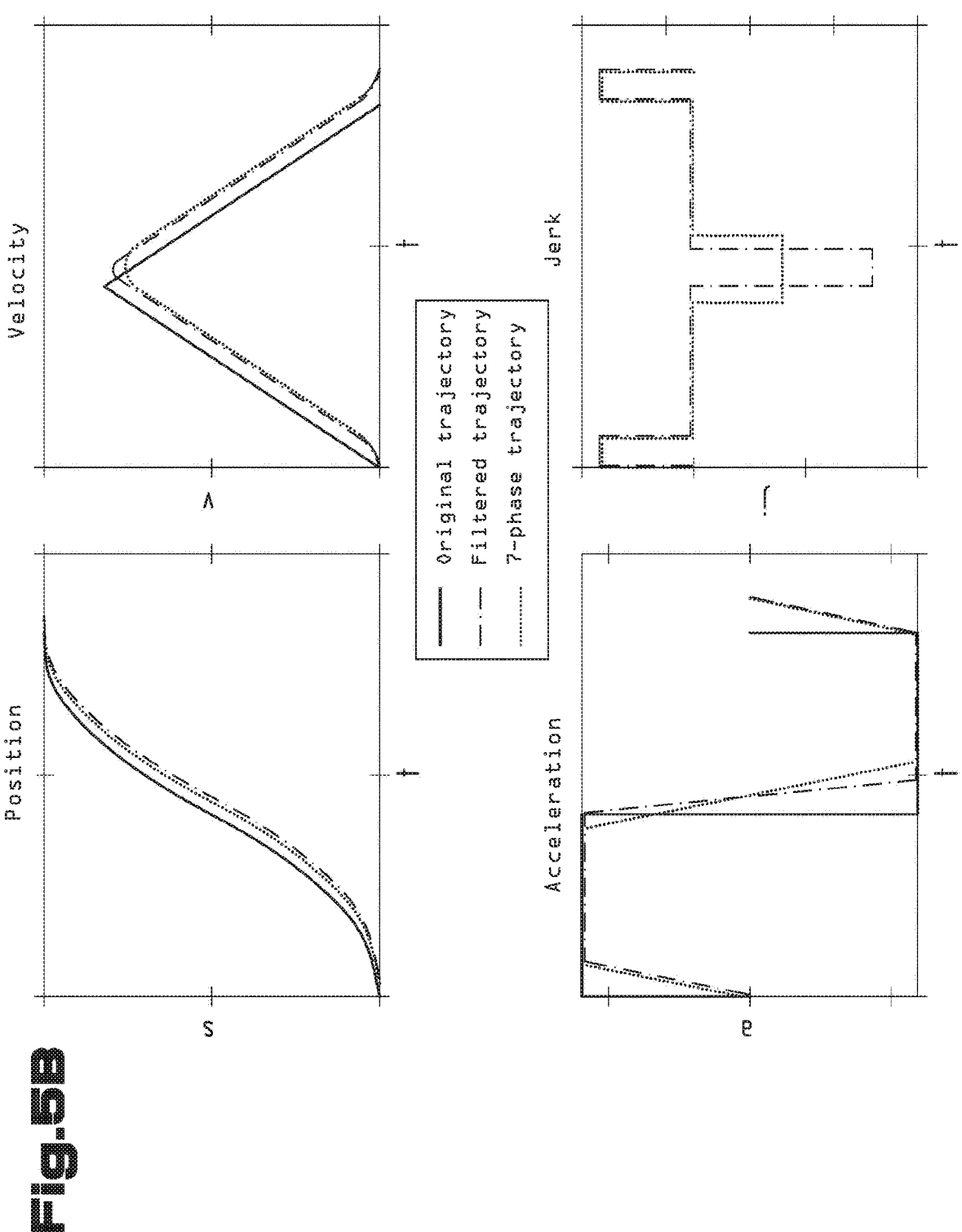
Figure 6:
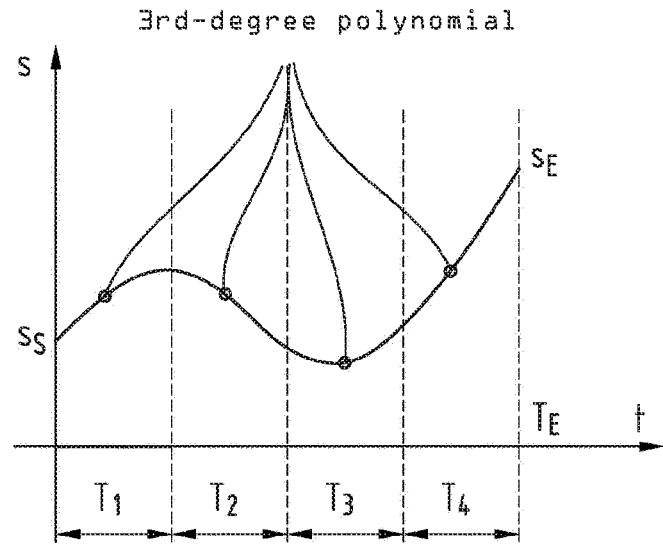
Figure 7:
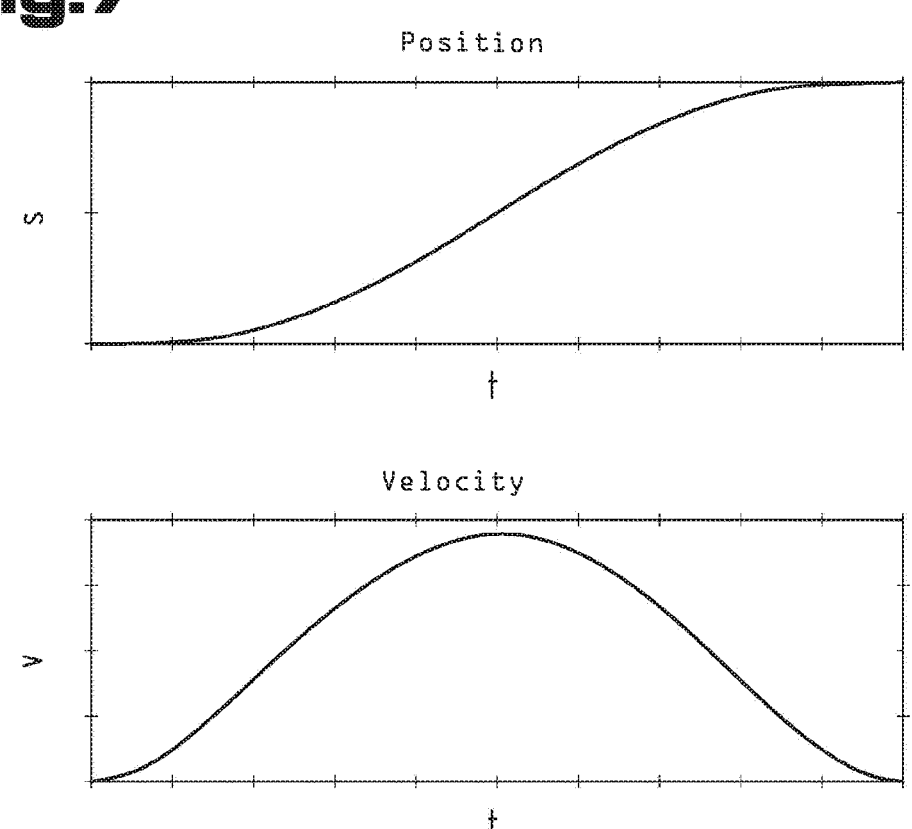
Figure 8:
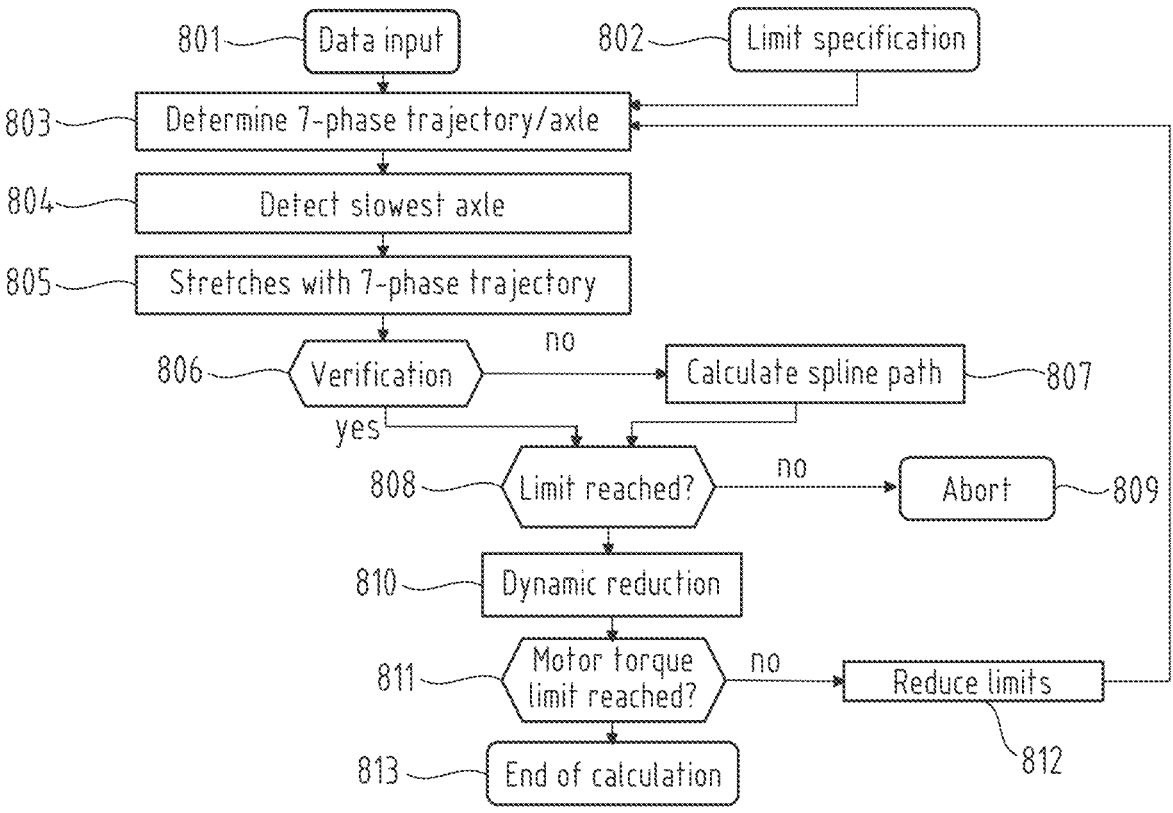
Figure 9:
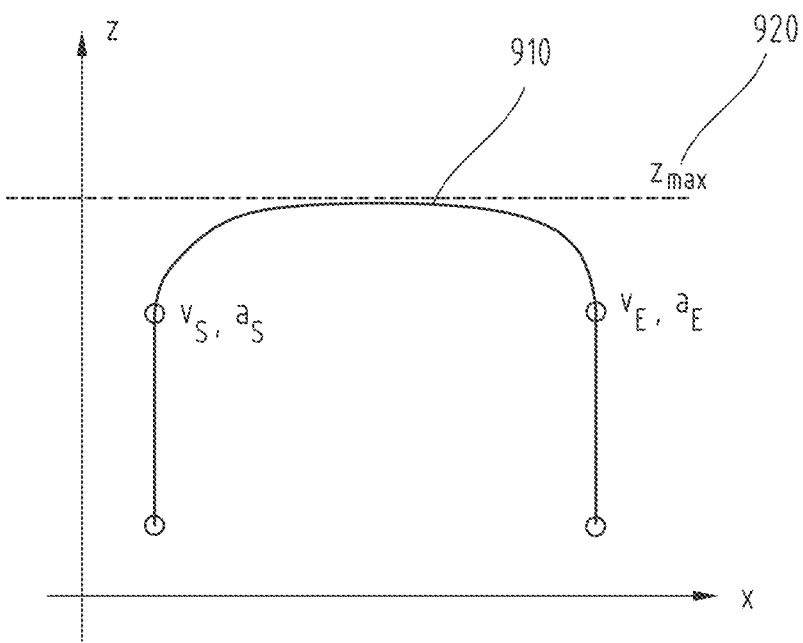
Figure 10:
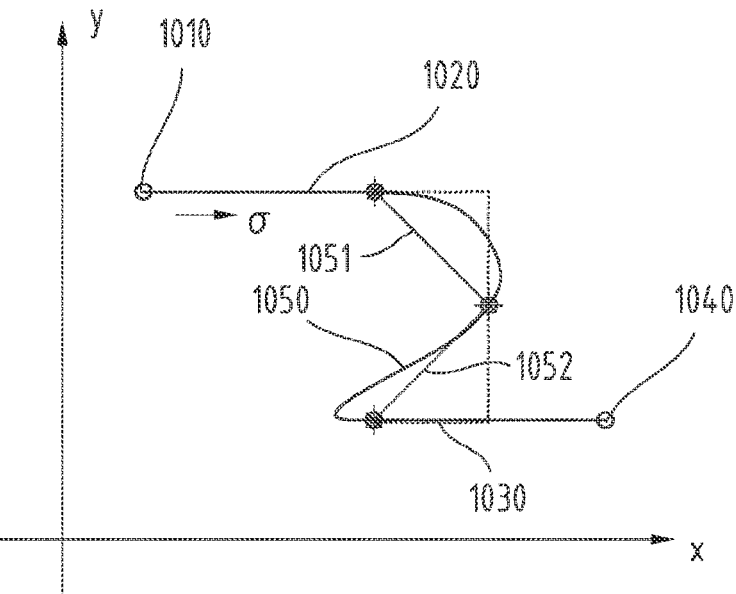
Figure 11:
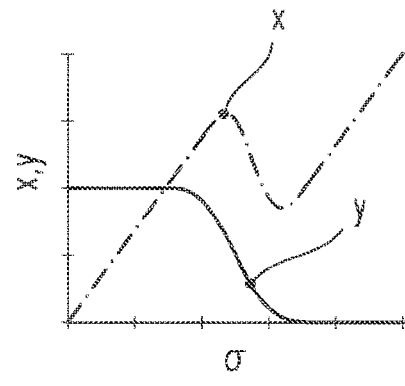
Figure 11:
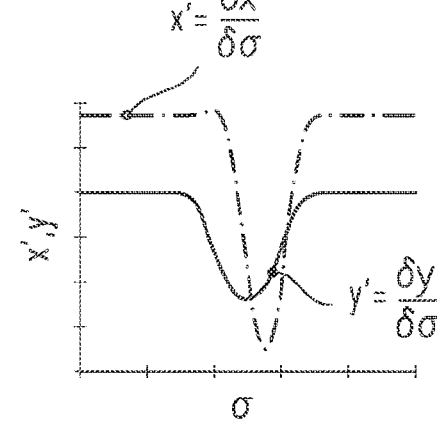
Figure 11:
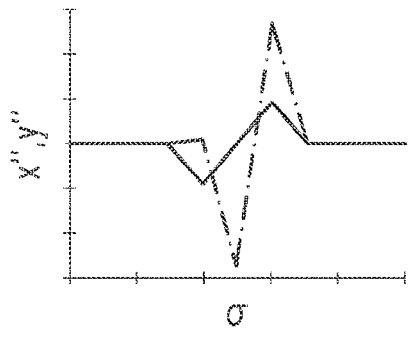
Figure 11:
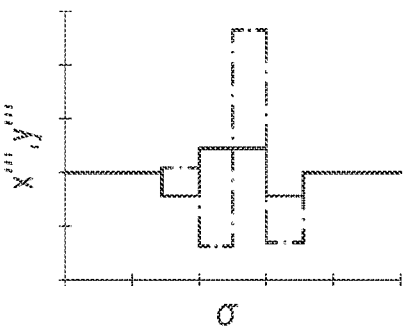
Figure 12:
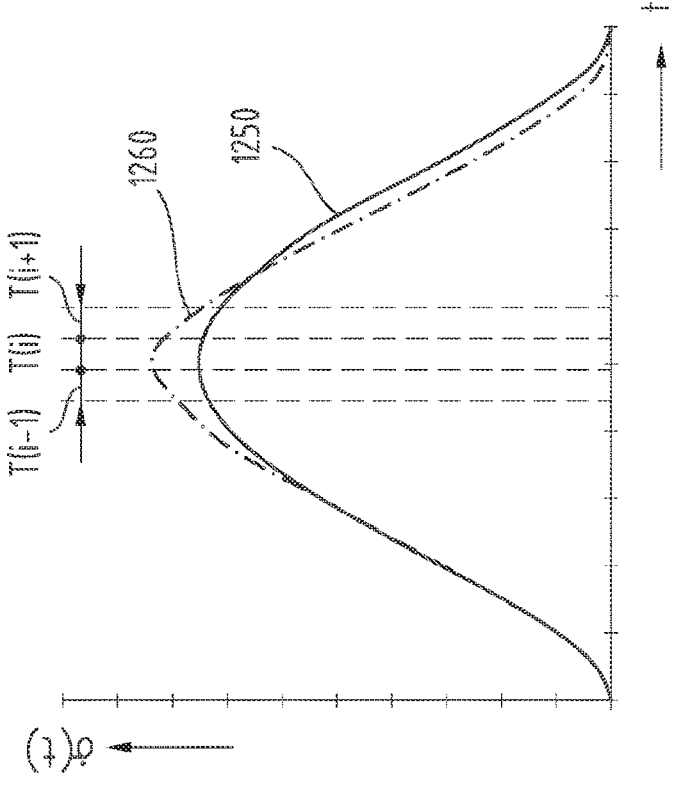
Figure 12:
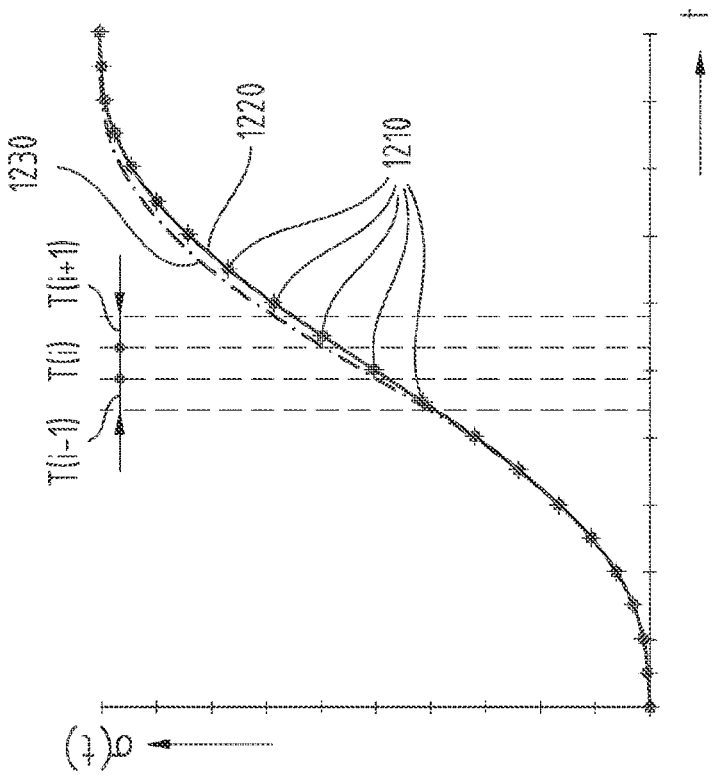
Figure 13:
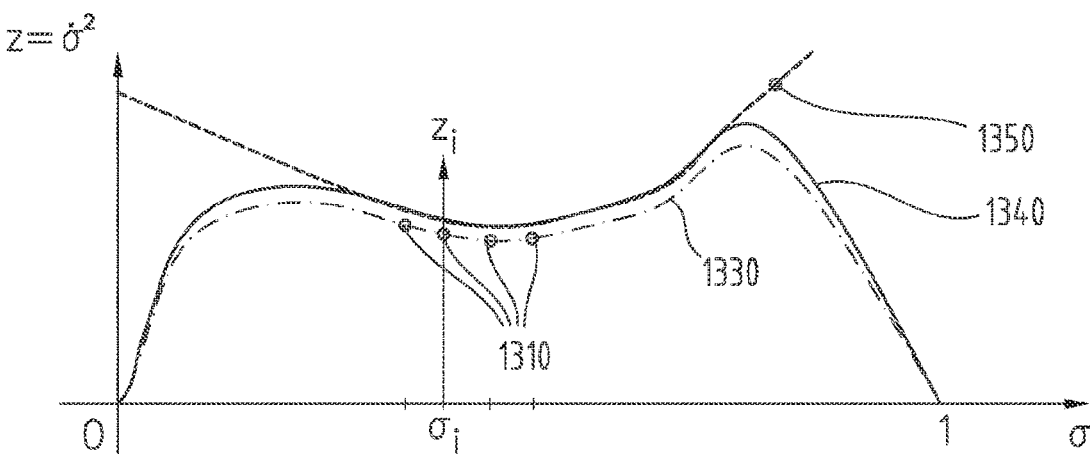
Figure 14:
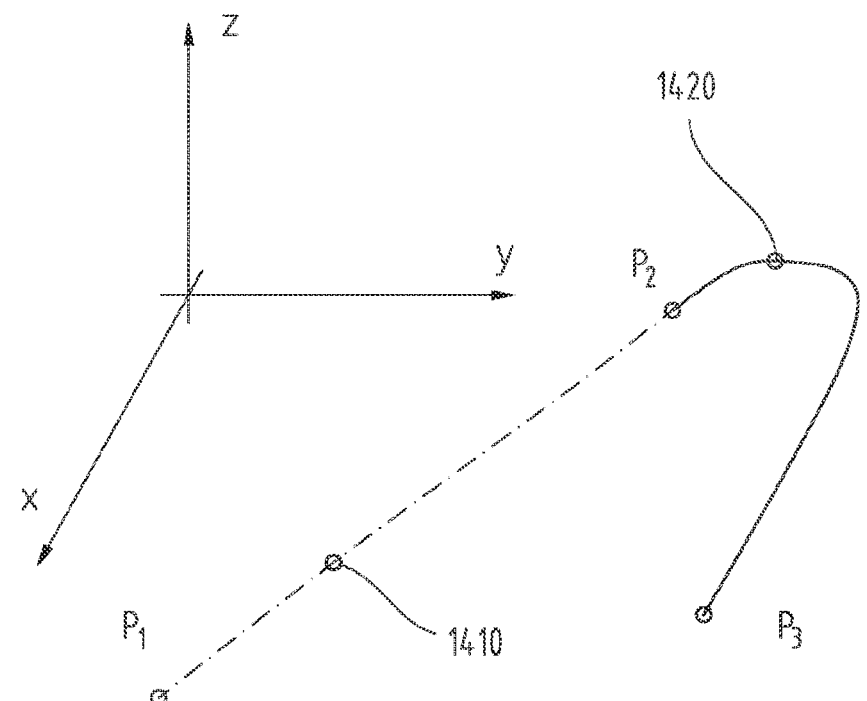
Figure 15:
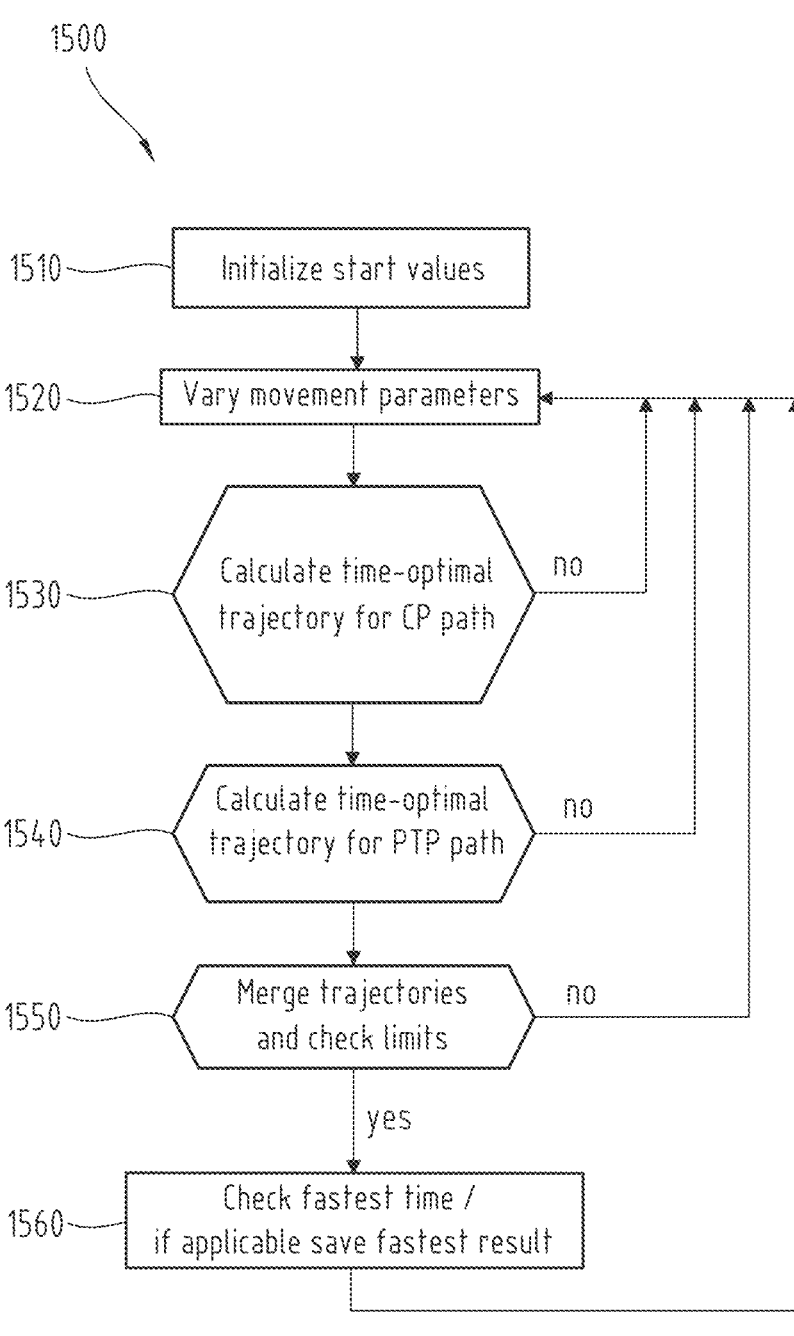
Figure 16:
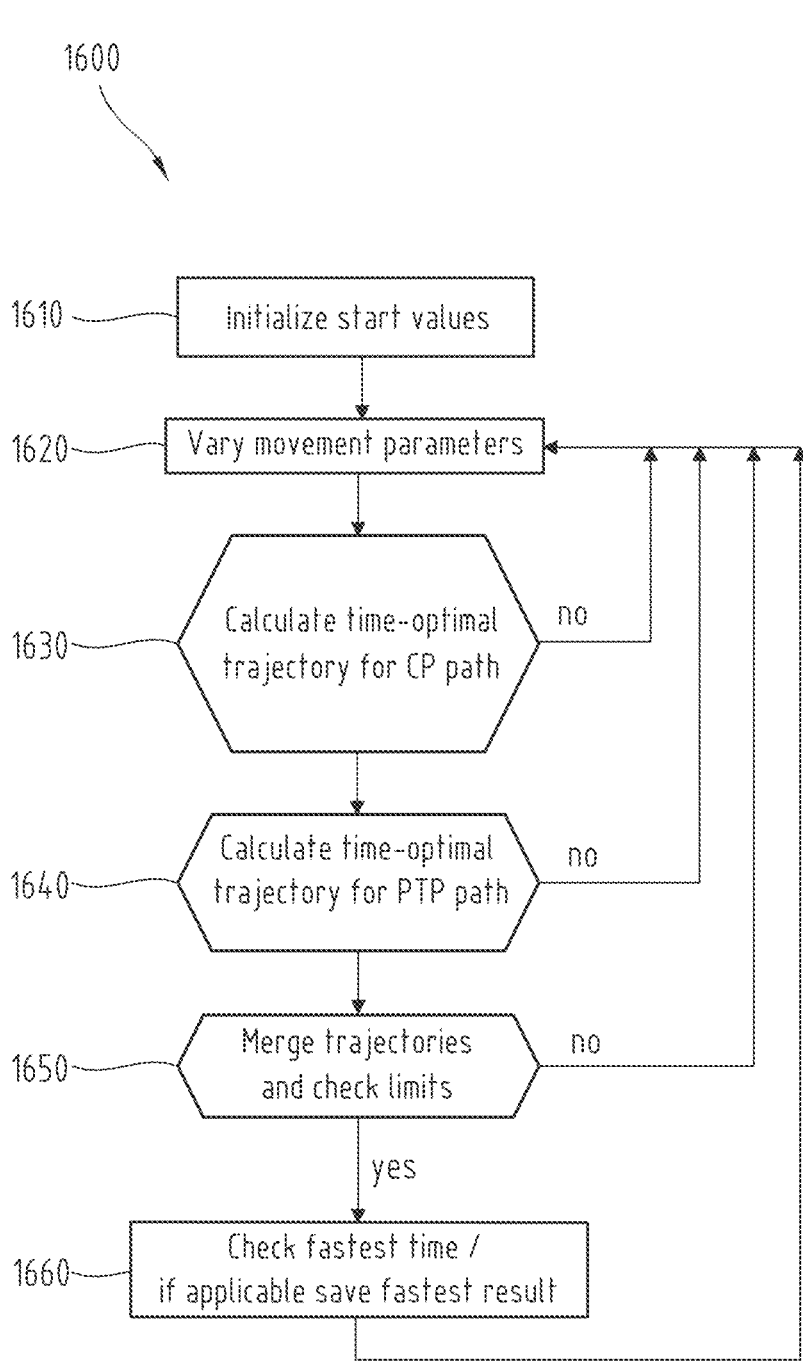

For a better understanding of the invention, it is explained in more detail with reference to the following figures. These show in significantly simplified, schematic representation:

FIG. 1 the path for a six-axis articulated arm robot, with various path sections and grid points;

FIG. 2 the path for a SCARA robot, with various path sections;

FIG. 3 an example of a calculated trajectory using a 7-phase trajectory;

FIG. 4 the application of a moving mean filter to a trajectory with a rectangular acceleration profile;

FIG. 5A, 5B comparisons of the 7-phase trajectory and the application of the moving mean filter;

FIG. 6 an example representation of a path which is determined by piecemeal defined third-degree polynomials;

FIG. 7 the joining of a start and end point by a path defined by a fifth-degree polynomial;

FIG. 8 a flow diagram for the calculation of a PTP path using a 7-phase trajectory and synchronisation trajectories;

FIG. 9 an example of a PTP path with a position limit;

FIG. 10 a representation of a route parameter using a combined path in the x and y coordinates;

FIG. 11 a representation of detected velocity, acceleration and jerk depending on the route parameter, FIG. 12 a correlation of the route parameter and time;

FIG. 13 representation of the optimisation problem in the phase space by parameterisation using the route parameter a;

FIG. 14 a combination of a CP and a PTP path with grid points;

FIG. 15 a flow diagram according to the present invention;

FIG. 16 a flow diagram according to the present invention, and

Figure 17:
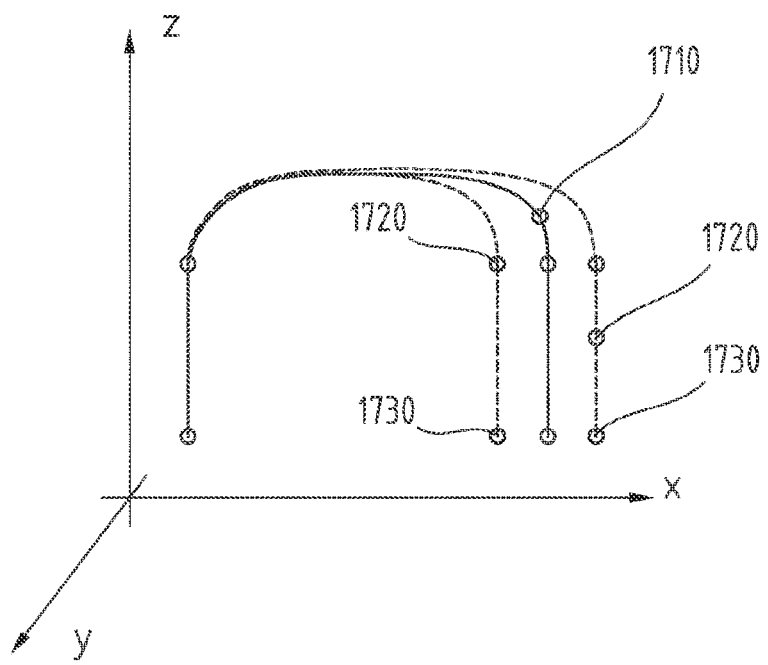

FIG. 17 a method for adapting the geometry of the path.

It is worth noting here that the same elements have been given the same reference numerals or same element configurations in the embodiments described differently, yet the disclosures contained throughout the entire description can be applied analogously to the same elements with the same reference numerals or the same element configurations. The indications of position selected in the description, such as above, below, on the side etc. refer to the figure directly described and shown, and these indications of position can be applied in the same way to the new position should the position change.

FIG. 1 shows a path for a six-axis articulated arm robot 100, with various path sections and grid points. The robot 100 shall hereby move the TCP 110 from the start point 121 to the end point 122. The grid points 131, 132 and 133 are to be passed through in doing so. Start and end points can always also be seen and treated as grid points.

The path can be divided into partial paths 141, 142, 143 and 144 through the grid points 131, 132 and 133.

The partial paths obtained by the division can, for example, be predefined by the user, for instance that the path between two grid points should be treated as an individual partial path. Normally, the process is as follows: With consecutive PTP sections a partial path is always created between 2 grid points. With CP sections, a partial path is defined by those grid points which are immediately consecutive and declared as CP type (i.e. "without PTP interruption").

The division can, however, also be automatically determined by simply predefining the start and target point along with further conditions such as surrounding boundaries. The grid points can thus be viewed either as additional divisions between partial paths, as is the case with PTP paths, or remain unconsidered in division, as is the case with interim points on the CP partial path.

FIG. 1 shows an example in which the grid points perform the division into 4 partial paths. The partial paths can be classified with the CP type or PTP type in advance, although it is also possible for the paths to be analysed automatically such that the CP type or PTP type can be assigned to the respective partial paths. The partial paths 141 and 144 are each a partial path of the CP type, in this particular case straights, and the partial paths 142 and 143 are each a partial path of the PTP type.

It should be noted that the paths shown in FIG. 1 and also in part in the other figures represent the result of the method according to the invention, in particular the Cartesian geometry in PTP paths. The path to be followed by the robot is thus determined in advance by path parameters. These path parameters can contain information regarding the grid points, i.e. start, end and other grid points. It should be noted that the start and end points can also serve as grid points or be interpreted as such. Furthermore, path types of partial paths can be contained. Finally, it is possible that the path parameters also comprise a maximum velocity for travelling along the respective partial path for one or more partial paths. In addition to the path parameters, the limits of the permitted dynamic etc. explained hereinafter are also known.

FIG. 2 shows the path for a SCARA robot 200, with various path sections. A SCARA robot (Selective Compliance Assembly Robot Arm) is a type of industrial robot where the assembly resembles a human arm. The TCP 210 of the robot 200 here runs along a path which is only shown schematically, and which can be segmented at the grid points 231 and 232 into partial paths 241, 242 and 243. The partial paths 241 and 243 are hereby of the PTP type and the partial path 242 of the CP type. The PTP paths 241 and 243 are only shown schematically in terms of the expected spatial geometry.

It should also be noted that the six-axis articulated arm robots and SCARA robots shown in FIGS. 1 and 2 are only examples of all possible industrial robots. The method according to the invention can be used for all industrial robots which are subject to path planning as discussed in this document. Other examples are delta robots and portal kinematics.

One object of the method is to provide a time-optimal movement path for industrial robots 100, 200. This is expressed mathematically as an optimisation method with the quality functional J:

$$J = \min_{T_E} \int_0^{T_E} 1\, dt$$

t represents time and $T_E$ represents the time interval or end time reached.

Boundary conditions (limits in dynamics, declared as minimum or maximum) and auxiliary conditions per axle i have to be adhered to during optimisation:

$$q_{i,min} \le q_i \le q_{i,max}$$

$$\dot{q}_{i,min} \le \dot{q}_i \le \dot{q}_{i,max}$$

$$\ddot{q}_{i,min} \le \ddot{q}_i \le \ddot{q}_{i,max}$$

$$\dddot{q}_{i,min} \le \dddot{q}_i \le \dddot{q}_{i,max}$$

$$\tau_{i,min} \le \tau_i \le \tau_{i,max}$$

$$\dot{s}_{i,min} \le \dot{s}_i \le \dot{s}_{i,max}$$

q hereby represents the axial angle, joint angle or also the robot coordinates or robot axle position, which can be both rotary or translatory, $\dot{q}$ the velocity, $\ddot{q}$ the acceleration, $\dddot{q}$ the jerk, $\tau$ motor torque or in some robot types the drive power, and the s path route.

That means that the method complies with the limits in the joint space per robot axle in the positional plane (however only on PTP paths, on CP paths the operator's input or the resulting geometry applies), velocities (temporal derivation of position), accelerations (temporal derivation of velocity) and in the jerk (temporal derivation of acceleration).

If necessary, the path velocity $\dot{s}$ on CP paths can be additionally limited along with other limits on the path (e.g., path acceleration), if required. Furthermore, it is possible that the expected motor torques $\tau_i$ are limited if a dynamic model, i.e. a mathematical model of the robot, is present.

In practice, the calculation time (that is to say, the time needed by the method to provide a result) is also of very great significance. Advantageously, the calculation during start-up should not take longer than a few milliseconds to a few seconds.

The method calculates the trajectory of a fully defined path, whereby the trajectory is available at the start of the movement. This is also referred to as an "offline" method. Information about boundary and grid points, path types, axle limits, path limits, movement or kinematic parameters, and sampling time can thereby be used as input values. Output values can then be joint angles $q_i(t)$ per time interval (sampling time).

The result can be shown as a matrix (or table or list) in which the joint angles of the industrial robot 100, 200 (per joint or axle) are specified per time interval. This information is provided to the robot controls. For the purposes of movement control, this table is processed as a cyclical target value on the basis of the motor.

A movement from the start to the end point is thus defined by a matrix in which the corresponding joint angles and the respective times are saved. A cyclical target value of this table thus achieves travel along the trajectory in compliance with the given auxiliary conditions.

The movement parameters or kinematic parameters can also comprise data such as arm lengths, masses, inertias, robot 100, 200 gearbox information and tool parameters such as distances, masses, and inertias.

Forwards transformations, also referred to as direct kinematics, or backwards transformations, also referred to as inverse kinematics, can be used in the calculation methods shown.

Forwards transformation $p=T(q)$ describes the calculation per pose p depending on the joint angle q (robot coordinates). In mathematical terms, this transformation is unequivocal if it is a serial kinematic. It cannot be expressed in general terms for parallel kinematics.

Backwards transformation $q=T^{-1}(p)$ describes the calculation of the joint angles q depending on world coordinates (i.e. pose p). In mathematical terms, this transformation is not unequivocal for serial kinematics, and generally an additional parameter is required to determine the applicable solution from the multiple solutions. The case of parallel kinematics often leads to a problem which is easier to solve. The determination of the joint coordinates can be performed using vector chains with the assistance of trigonometric functions.

In more complex industrial robots, motor torque limits (due to inertia effects: Coriolis, centrifugal forces, friction, . . . ) cannot be sufficiently represented using acceleration or deceleration limits. To fulfil this requirement, a mathematical kinematic model is needed which calculates the motor torque $\tau$ depending on the positions q, velocities $\dot{q}$ and accelerations $\ddot{q}$ of the axles. Generally speaking, such a model can be expressed in the following, non-linear manner (M: mass matrix, C: matrix regarding Coriolis and centrifugal effects, F: Coulomb friction matrix, and G: vector of weight forces and other non-linearities):

$$M(q)\ddot{q} + C(q, \dot{q})\dot{q} + \mathrm{sgn}(\dot{q})F(q) + G(q) = \tau$$

This model is dependent on a plurality of parameters (kinematic and dynamic parameters) which cannot all be identified. A conversion of the model into what is known as a base parameter representation is necessary to subsequently be able to perform division into identifiable and non-identifiable parameters, and furthermore, identification journeys have to be performed to determine real parameters. The base parameter representation (where $\theta$ is the information matrix and p is the parameter vector) is as follows:

$$\theta(\ddot{q}, \dot{q}, q)p = \tau$$

This is conventionally used as the expected motor torque when performing working load or feasibility calculations.

In a point-to-point path (PTP path) the start position and the end position are connected in the joint plane (i.e. robot axle position) via trajectories (paths) per axle. By the same token, that means that the geometric spatial path (on the TCP) has no relevance in the calculation, and that the geometry on the TCP 110, 210 is thus derived implicitly due to the dynamics of the axles (limits in velocity, acceleration and jerk).

Various individual trajectories (per axle) are used in the calculation which can be optionally synchronised to the slowest travel time.

With a 7-phase trajectory, which can be used as an individual trajectory in the PTP path or as a trajectory for the route planner for a CP path, a rectangular shape is assumed for the jerk. The relation to the other describing path parameters (such as acceleration, velocity, and position) is given via an integration. Such trajectories therefore also fall within the "bang-bang" trajectory group because the jerk in this group of trajectories can only assume three values, namely 0, a maximum value, or a minimum value. If the jerk has a value of zero, the acceleration or velocity is accordingly at maximum. All other path parameters (such as the duration of the sections) can thus be calculated upon determination of the jerk and in consideration of the auxiliary conditions.

A 7-phase trajectory in the time vector can consist of 7 possible phases or sections in which the respective maximum values apply in order to restrict velocity limits, acceleration limits, and jerk. This threefold differentiable path is, with these restrictions, the fastest possible, with the travel time $T_E$.

FIG. 3 shows an example of a calculated trajectory using the 7-phase trajectory. Due to the selection of the jerk and the auxiliary condition, the acceleration, velocity, and position can be derived through integration. In FIG. 3, the axes are labelled with s for route or position, v for velocity, a for acceleration, j for jerk, and t for time. As long as not otherwise specified, these labels also apply to the other figures.

The position progression is shown in the top left. The velocity progression is shown in the bottom left. The acceleration progression can be seen at the top right. The jerk progression can be seen at the bottom right. The time is shown in all parts on the horizontal axis and is split into sections. In the figure, these sections are the same size, i.e. equidistant, however this is only by way of explanation and is generally not the case. Indeed, it can occur that sections are not visible because their start time and end time are identical.

It can thus be seen that in each of the sections, one of the limits (i.e. velocity, acceleration, or jerk) reaches the maximum permitted value. This can also be seen in the respective image and denoted with $v_{max}$, $a_{max}$ (positive and negative on the vertical axis) and $j_{max}$ (positive and negative on the vertical axis).

In addition to the start and end points, the velocity ($v_S$, $v_E$) and acceleration ($a_S$, $a_E$) boundary conditions are also considered. The index S hereby represents the conditions at the start point, the index E represents the conditions at the end point.

When stretching the path $T_{sync}=k \cdot T_E$ with k>1, in particular with boundary conditions (one of $v_S$, $v_E$, $a_S$, $a_E$ unequal zero) there is no mathematical guarantee that a solution exists. There are various methods for calculating such stretching.

Alternatively, a rectangular path can be assumed in the acceleration, and subsequently a moving mean filter with the filter breadth (related to the time) $t_{filt}$ can be overlaid, allowing for jerk restrictions to be considered.

Alternatively, the trajectory can consist of sinusoidal profiles. Other alternatives are also conceivable.

FIG. 4 shows the application of a filter to a rectangular acceleration. Reference numeral 410 refers to the impulse response of the filter, the shape of which largely influences the acceleration. In this case it is shown as a response of a simple mean filter. In FIG. 4, the time t and the acceleration a are shown on the axes.

If the 7-phase trajectory and the rectangular path are compared with the moving mean filter, they are identical in many areas, as can be seen in FIGS. 5A and 5B.

FIGS. 5A and 5B show comparisons of the 7-phase trajectory and the application of a filter. In FIG. 5A the velocity limit is active, as opposed to in FIG. 5B with a limit that is not reached. It should also further be noted that in FIG. 5B the 7-phase trajectory degenerates to a "5-phase" trajectory due to the velocity limit that is not reached.

The position progression is hereby shown in the top left. The velocity progression is shown in the bottom left. The acceleration progression can be seen at the top right. The jerk progression can be seen at the bottom right.

The original trajectory, which has a rectangle in the acceleration, can be seen in each of the graphs. The original trajectory is denoted by a solid line (-). Furthermore, the trajectory can be seen after application of the filter. This is denoted by a line with alternating dashes and dots (- •-). The trajectory that can be seen is the 7-phase trajectory. This is denoted by a dotted line (• • • • •). In particular in the graphs for position and velocity, the lines for the filtered trajectory and the 7-phase trajectory have a congruent progression. This is also true of the graphs shown in FIG. 5A for acceleration and jerk. Only in the graphs shown in FIG. 5B for acceleration and jerk do these two lines have an at least partially divergent progression.

The advantage of the path with the filter is that the calculation is significantly simpler and even when stretching the path to a desired time with given boundary conditions: $v_S$, $v_E$, $a_S$, $a_E$, a guaranteed result is provided. The disadvantage is that in certain constellations of the limits (if the velocity limit is not reached), the jerk is insufficiently limited (as shown at the bottom right of FIG. 5B), i.e. it is twofold what is required.

Alternatively, a similar result can be achieved if the velocity profile (e.g., configured as a rectangular profile) is mean filtered twice.

A spline path can be used in particular for synchronisation, if for example the 7-phase cannot be calculated or the filtered acceleration rectangular profile does not reach the dynamic limits. The path of a spline or polynomial section is configured in the style of a cubic spline and consists of 4 partial sections with third degree polynomials, as can be seen in FIG. 6, which shows an example representation of a third-degree polynomial in the positional plane. The position is divided temporally into four parts and has a start point $s_S$ and an end point $s_E$.

The simplest conceivable trajectory to dynamically connect two points is obtained by generating a polynomial trajectory. Since along with angle, velocity, and acceleration the jerk is also taken into account for the present invention, a fifth-degree polynomial is used, where ai are the polynomial coefficients:

$$y(t) = \sum_{i=0}^{5} a_i t^i$$

FIG. 7 shows a connection of a start and end point with a fifth-degree polynomial. The corresponding velocity is obtained by the first derivation. In this diagram, the time t is shown to the right, whilst the position s and the velocity v are shown towards the top.

No limits can be considered in advance here, although dynamically this trajectory is the smoothest, i.e. the jerk is minimised. This trajectory is therefore used for synchronisation parts in particular. This is also known as the "minimal jerk trajectory".

The method for calculating a PTP path with given boundary conditions and limits is shown in FIG. 8. The boundary conditions, in particular the respective velocity and acceleration on each axle, should be considered at the start and end point of the path.

In FIG. 8, data input is started at step 801, for example that the path should lead from the start to the end point, and the boundary conditions at the start and end point. 802 designates the limits, such as the maximum acceleration, the maximum velocity, and the maximum jerk per axle.

Both are processed in 803 in order to determine a 7-phase trajectory per axle. Instead of the 7-phase trajectory, other approaches to calculating trajectories can also be applied, usually bang-bang trajectories, in particular a mean filtered rectangular trajectory in acceleration.

In 804, the slowest axle is detected and the preliminary PTP travel time $T_{sync}$ determined.

In step 805, all remaining axles are then stretched over a further 7-phase trajectory in terms of a synchronisation (elongation) to $T_{sync}$. Here again, one of the other trajectories can be used, as outlined above.

In step 806 a check is performed to see if the synchronisation could be successfully calculated. If so, step 808 is proceeded with, if not, a spline path is calculated in step 807 before proceeding with step 808. It should also be noted here that any synchronisation trajectories can be used.

Step 808 is a check whether limits are met. In particular whether the axle position limits for PTP paths remain within the prescribed ranges and whether acceleration, velocity and jerk per axle are within the limits.

If it is determined in step 808 that the calculated path does not allow for the values to remain within the limits during movement, the calculation of this path with the respective movement parameters is aborted in step 809.

The method in FIG. 8 can then be started again with new values for the movement parameters.

If it is determined in step 808 that the limits are reached, a reduction of the dynamic can then be performed in step 810. A dynamic reduction is achieved by exchanging the individual movements (such as mean filtered rectangle in acceleration, spline, polynomial path, etc. and repeat check whether the limits in the position, velocity, acceleration, and jerk per axle can be adhered to).

Finally, in step 811 a check is performed whether the motor torque limits for each of the industrial robot's 100, 200 motors are adhered to. Should that not be the case, the limits are temporarily reduced in step 812, i.e. those limits ($v_{max}$ and/or $a_{max}$) are detected that have to be reduced due to the dynamic model, and the method jumps back to step 803 with the new limits where the reduced limits are used instead of the initially defined limits 802.

Should it be determined in step 811 that the motor torque limits are reached, the calculation of the PTP path, which in the present invention can be a partial path of the entire path, is concluded in step 813.

It should be noted that position limits per axle or joint are only considered indirectly by reducing the dynamic. With this method, the TCP can also be restricted in a certain working area (via an extended check of spatial coordinates, not shown in FIG. 8).

FIG. 9 shows an example of a portal handling (x, y, z movements possible) of a PTP path 910 with a position limit 920 in z. This position limit can only be adhered to if the velocity and the acceleration at the start and end point, i.e. $v_S$, $a_S$, $v_E$ and $a_E$, are adjusted.

The process shown is particularly advantageous because the sequence of the calculation steps is optimal due to the calculation times of the partial steps in this manner.

It should be noted that if there are no boundary conditions, i.e. the velocity and acceleration equal zero at the start or end point ($v_S$, $v_E$, $a_S$ and $a_E$=0), there is then in any case at least one solution and the abort step is not activated (i.e. partial step 809 is then not activated).

A method is described in the following which can be used for determining a time-optimal trajectory for a path which consists of at least one partial path, and the partial paths are either CP paths, PTP paths, or a combination thereof.

In these methods, the abort criterion is determined by a specific number of iterations. In the following, an iteration method concerning velocity, also called a v-iteration, is explained, in which the velocity array $v_{iter}$ is specified as n velocity transitions (e.g.: $v_{iter}=[v_{max,1}, \ldots, v_{max,n}]$/MaxIter). Possible velocities are thereby tested and the entry which generates the shortest travel time over the entire path is applied as the "best" velocity.

The following pseudo-code can be used if there is at least one transition, for instance with the v-iteration.

```
for j = 1:MaxIter            % maximum number of iterations
    for i = 1:NumOfVelArray  % maximum number of velocity
                             % transitions
        vold = VelArray(i);  % note old value
        VelArray(i) = j*viter(i);
        % function which analyses all partial methods CP, PTP
        % and calculates the travel time J with the given
        % boundary conditions (= velocity transitions)
        J = SumTravelTimesOfPartialPaths( )
        if J <= JBest
            % shorter travel time could be achieved due to
            % increase and save → as best result so far
            JBest = J;
        else
            % otherwise undo increase
            VelArray(i) = vold;
        end
    end
end
```

It is entirely possible here that only suboptimal solutions are found because each velocity transition actually has to be combined with each further transition (that is to say, the calculation of all possible solutions and their combinations). It has, however, been observed that by incrementally increasing the velocity, the optimum can nevertheless be determined very well.

A geometrically defined spatial path (e.g., in world coordinates), that is to say a CP path, can be a straight, a circular path, a spline path, or any other mathematical function (e.g., a helix), or a combination thereof. The first step in calculating an optimal movement along the CP path is a parameterisation via the route parameter, that is to say that the path and the entire dynamic of the joint angles are formulated depending on the route parameter.

FIG. 10 shows a representation of the route parameter by means of a combined path in the world coordinates x and y which consists of two straights and a spline curve. The position on the path is clearly defined by the route parameter $\sigma$. 1010 is the start point, 1040 the end point.

The route parameter $\sigma$ is substantially calculated from the path route. On a straight 1020, 1030 this route parameter equates exactly to the path route; for the sake of simplicity, the end value 1040 (target) can be defined as 1. With a circle, or part of a circle, the route parameter is the angle, and on a spline 1050 the stretch sections on a linear connection 1051, 1052 of the grid points.

If the route parameter is defined, the entire geometry of the stretch to be passed through can be parameterised in position and orientation, as can be seen in FIG. 11. FIG. 11 shows the position in x and y in world coordinates at the top left, above the route parameter. The complete parameterisation of the trajectory is then obtained by repeated derivation according to the route parameter. The following is shown: top right—the velocity as the first derivation of the route parameter, bottom left—the acceleration as second derivation of the route parameter; and bottom right—the jerk as the third derivation of the route parameter. The following applies:

$$x = x(\sigma)$$

$$x' = \frac{\partial x}{\partial \sigma} \quad \dot{x} = \frac{\partial x}{\partial \sigma}\dot{\sigma} = x'\dot{\sigma}$$

$$x'' = \frac{\partial^2 x}{\partial \sigma^2} \quad \ddot{x} = \frac{\partial^2 x}{\partial \sigma^2}\dot{\sigma}^2 + \frac{\partial x}{\partial \sigma}\ddot{\sigma} + x''\dot{\sigma}^2 + x'\ddot{\sigma}$$

$$x''' = \frac{\partial^3 x}{\partial \sigma^3} \quad \dddot{x} = \frac{\partial^3 x}{\partial \sigma^2}\dot{\sigma}^3 + 3\frac{\partial^2 x}{\partial \sigma^2}\dot{\sigma}\ddot{\sigma} + \frac{\partial x}{\partial \sigma}\dddot{\sigma}$$
$$= x'''\dot{\sigma}^3 + 3x''\dot{\sigma}\ddot{\sigma} + x'\dddot{\sigma}$$

Using the transformations (direct and indirect kinematics), this relation can subsequently be established, where the dependency for the pose $p=p(\sigma(t))$, and analogously for the joint angle $q=q(\sigma(t))$, is used:

$$\left. \begin{aligned} p &= T(q) \\ p' &= J(q)q' \\ p'' &= J(q)'q' + J(q)q'' \\ p''' &= J(q)'' + 2 \cdot J(q)'q'' + J(q)q''' \end{aligned} \right\} \quad \begin{aligned} q &= T^{-1}(p) \\ q' &= J(q)^{-1}p' \\ q'' &= J(q)^{-1}(p'' - J(q)'q') \\ q''' &= J(q)^{-1}(p''' - J(q)'' - 2 \cdot J(q)'q'') \end{aligned}$$

the Jacobi matrix J is used here, which describes the relation between the joint velocity and the derivation of the pose:

$$\dot{p}(t) = J(q)\dot{q}(t).$$

This relation is linear and thus constitutes a key component in robotics, because linear dependency generally applies.

The joint angles can now be formulated via the route parameter and thus via the time vector:

$$q(t) = q(\sigma)$$

$$\dot{q}(t) = q(\sigma)'\dot{\sigma}$$

$$\ddot{q}(t) = q(\sigma)''\dot{\sigma}^2 + q(\sigma)'\ddot{\sigma}$$

$$= q(\sigma)''\dot{\sigma}^2 + q(\sigma)'\dot{\sigma}'\dot{\sigma}$$

$$q^{(iii)}(t) = q(\sigma)'''\dot{\sigma}^3 + 3q(\sigma)''\dot{\sigma}\ddot{\sigma} = q(\sigma)'\dddot{\sigma};$$

For CP paths, on the one hand a method in the time range can be used which itself is an iterative method and which incrementally increases the velocity from a valid start solution or initial path $\sigma_{start}(t)$ in compliance with the dynamic limits until no further time improvement is possible. This velocity increase is generated by the time intervals T(i) being shortened by a certain time delta.

This can be seen in FIG. 12 which shows a relation of the route parameter $\sigma(t)$ and the time t. The objective of the optimal path is to pass through the route parameter in the shortest time from $\sigma(0)=0$ to $\sigma(t_{end})=1$, i.e. from the start point to the end point, in compliance with the auxiliary conditions, such as limits. 1210 hereby designates the grid points, and path 1220 is the initially assumed path, whilst path 1230 is symbolic of a path in a jth iteration of the calculation. Additionally, the temporal derivation of the route parameter $\dot{\sigma}$ (t) is shown in the right half of FIG. 12. 1250 is here the initial path and 1260 the path in the jth iteration.

The sequence of this calculation can be described in pseudo code as follows:

```
 1    for j = 1:MaxIter          % path cycles
 2      for i = 1:NumOfKnots      % loops over the number
                                  % of grid points
 3        Reduce T(i) and its immediate neighbours
 4        if DynamikOK           % are all limits adhered to?
 5          Accept reduction of T(i)
 6        else
 7          Undo reduction of T(i)
 8        end
 9      end
10    end
```

The outer loop (lines 1 to 10) hereby passes through the variable j as is predetermined by the MaxIter variable. That means MaxIter determines the maximum number of process iterations.

The inner loop (lines 2 to 9) is thereby passed through as often as defined by the number of grid points on the path (NumOfKnots variable).

In line 3, the time interval T(i) is reduced by a certain delta, i.e. depending on the current i, i.e. the grid point, and the immediate neighbours T(i−1) and T(i+1). The delta can be defined as a fraction of the sampling time, for instance.

Subsequently, during differentiation in line 4, a check is performed to see if all limits are adhered to. If that is the case, the previous reduction of the time intervals is accepted in line 5. If the limits are exceeded or fallen short of, the reductions are revoked in line 7 before the next iteration over the next grid point is proceeded with by ending the inner loop in line 9.

All limits can be checked when the check for adherence to limits is performed in line 4: velocity, acceleration and jerk limits in the joint plane, motor torque per axle, and path velocity itself, which is calculated as follows:

$$v_{Bahn} = \sqrt{x'^2_{TCP} + y'^2_{TCP} + z'^2_{TCP}}\,\dot{\sigma}$$

A further method for calculating the CP bath is a method in the phase space. This method presupposes a further transformation:

$$z = \dot{\sigma}^2$$

$$z' = (\dot{\sigma}^2)' = 2\dot{\ddot{\sigma}}$$

$$z'' = \frac{\partial z'}{\partial \sigma} = 2\frac{\partial \dot{\ddot{\sigma}}}{\partial \sigma} \quad \boxed{\dot{\ddot{\sigma}} = \frac{d\dot{\ddot{\sigma}}}{dt} = \frac{\partial \dot{\ddot{\sigma}}}{\partial \sigma}\frac{\partial \sigma}{\partial t} = \dot{\ddot{\sigma}}'\dot{\sigma} = \frac{1}{2}z''\sqrt{z}}$$

$$\dot{q}(t) = q(\sigma)'\sqrt{z}$$

$$\ddot{q}(t) = q(\sigma)''z + \frac{1}{2}q(\sigma)'z'$$

$$q^{(iii)}(t) = q(\sigma)'''\sqrt{z}z + \frac{3}{2}q(\sigma)''z'\sqrt{z} + \frac{1}{2}q(\sigma)'z''\sqrt{z};$$

z is here the velocity which is defined by the square of the temporal derivation of the route parameter $\sigma$.

This transformation eliminates the explicit time dependency, resulting in an extremely efficient method: All parameterisations can be determined in advance because the discretisation is now based on constant $\sigma_i$ steps and not on a non-equidistant time vector. This is also shown in FIG. 13 where it can be seen that with an intelligent transformation selection, the problem is reduced to a one-dimensional optimisation problem with the new variable $z(\sigma)$. The grid points 1310 and the development of $z(\sigma)$ over two iterations 1330 and 1340 of the velocity parameter can be seen here. 1350 hereby designates the limit curve, i.e. the progression of the limit for z.

The sequence of this calculation can be described in pseudo code as follows:

```
11    for j = 1:MaxIter          % path cycles
12      for i = 1:NumOfKnots      % loops over the number
                                  % of grid points
13        Increase z_i at the point σ_i
          and its immediate neighbors
14        if DynamikOK           % are all limits adhered to?
15          Accept z-increase
16        else
17          Undo z-increase
18        end
19      end
20    end
```

In turn, the outer loop (lines 11 to 20) hereby passes through the variable j as is predetermined by the MaxIter variable. That means MaxIter determines the maximum number of process iterations.

The inner loop (lines 12 to 19) is thereby passed through as often as defined by the number of grid points (NumOfKnots variable).

In line 13 $z_i$ is increased at the $\sigma_i$ point and its immediate neighbours. This increase is hereby preferably a predetermined fraction of the velocity limit. Subsequently, during differentiation in line 14, another check is performed to see if all limits are adhered to. If that is the case, the z-increase is accepted in line 15. If the limits are exceeded or fallen short of, the z-increase is revoked in line 17 before the next iteration over the next grid point is proceeded with by ending the inner loop in line 19.

All limits can again be checked when the check for adherence to limits is performed in line 14: velocity, acceleration and jerk limits in the joint plane, motor torque per axle, and path velocity itself.

The path velocity in the phase space is thereby formulated as follows:

$$v_{Bahn}^2 = \left(x_{TCP}'^2 + y_{TCP}'^2 + z_{TCP}'^2\right)z$$

The motor torque is thereby expressed as is known in the art:

$$a(\sigma)z' + b(\sigma)z + c(\sigma) = \tau$$

This is done using the following relation:

$$a(\sigma) = 1/2\,M(q)q'$$
$$b(\sigma) = M(q)q'' + C(q,q')q' + \text{sgn}(q')F(q)$$
$$c(\sigma) = G(q)$$

The difficulty with this method is the retransformation into the time range because at the start and end, i.e. start point and end point, the velocity can assume the zero value and there is thus a division by zero. The retransformation can be calculated according to this rule:

$$t = \int_0^{\sigma_E} \frac{1}{\sqrt{z}}\,d\sigma = \int_0^{\sigma_E} \frac{1}{\sqrt{\dot{\sigma}^2}}\,d\sigma$$

This problem can, however, be rectified by various approximations on the peripheries.

In contrast thereto, in conventional methods the jerk is never considered because when disregarding the jerk, the method is linear in z and z', and conventional optimisation methods can thus be applied, such as a Bellman method or the like.

The methods described here for determining a CP path are provided just by way of example. Other methods can also be used, such as applying a 7-phase trajectory or polynomial trajectory to the route parameter in the time range. The trajectory parameters, such as the end time of the polynomial trajectory, are thereby increased until all limits are met.

Preferably, both of the aforementioned methods are always calculated for pure CP paths because the methods have different strengths and weaknesses. With very long paths it is advantageous, i.e. more resource-friendly regarding the required computing time, to calculate in the phase space, and with comparatively short paths rather in the time range because approximations through zero division can then have a very negative effect.

In the methods for determining the best path for a CP path presented here, the abort criterion is defined such that when passing through the entire CP path, no single velocity increase (in the phase space for CP) or time interval reduction (in the time range for CP) can be performed at the grid points anymore because doing so would infringe the dynamic limits and thus the trajectory would not have changed over the last iteration. The optimum is thus determined and the iteration can be concluded.

It should be noted that it is nevertheless possible for the velocity increase or time interval reduction to be revoked at a grid point $\sigma_k$ because the dynamic limits are exceeded. If, however, an amendment can be carried out at a different point $\sigma_k$, when considering the entire CP path the travel time can be further reduced over the last valid iteration through the CP path.

In the method according to the invention, the aforementioned PTP method in combination with the CP method in the time range and other methods in the time range (expression of the time profile of the route parameter as 7-phase, polynomial path, etc.) is combined in order to detect the best possible (in terms of travel time) velocity v and acceleration a at the transition points.

An example to explain the functioning is shown in FIG. 14 with a simple path which is a combination of a CP partial path 1410, which is a CP path, and a PTP partial path 1420. FIG. 14 shows a path represented in world coordinates x, y and z. The points designated $P_1$, $P_2$ and $P_3$ represent grid points. $P_1$ is the start point and $P_3$ the end point. $P_2$ is the point at which the CP path 1410 transitions into the PTP path 1420. The transition velocity $v_j$ and acceleration $a_j$ are to be determined in point $P_2$.

The method according to the invention, shown in FIGS. 15 and 16, can hereby be performed twice; the first time 1500, only the transition velocity $v_j$ is detected, where $a_j$ is assumed to be zero. During the second cycle 1600, the detected transition velocity $v_j$ can then be used as the start value, and then the acceleration can be varied. Nevertheless, minimal changes to the previously determined transition velocity can be made during the second cycle 1600.

The two-phase method allows for the optimisation of the calculation time which provides a faster result than a complex loop which would entail both calculations. This is due to the velocity at the transition point being the decisive factor for a fast travel time over the entire path. The first cycle of the method, i.e. the v-iteration described hereinafter, is therefore decisive. The second cycle, hereinafter described as the v-a-iteration, represents a subsequent fine tuning.

The v-iteration is shown in FIG. 15 and represents a computer-implemented method for determining a time-optimal trajectory before the start of movement for a movement of an industrial robot 100, 200 predefined by movement parameters on a path defined by path parameters which have at least a start point 121, 1010 and an end point 122, 1040 and comprise at least one path type, in compliance with predetermined limits.

The iteration is performed via $v_{iter} = v_{min} \cdots v_{max}$ where n is the number of steps (for a CP to PTP transition with $v_{min}=0$). That means the velocity is increased with every cycle of the process. If a transition is made from a PTP partial path to another PTP partial path, the velocity is varied on all axles up to the allowable $v_{max}$. The acceleration thereby remains constant, $a_j=0$.

More specifically, in step 1510 $v_j$ and $a_j$ are initialised as zero, i.e. for $j=0$ $v_j$ and $a_j$ equal 0. In step 1520, the velocity is then increased such that $v_j$ (i)$=j*v_{iter}$(i). In step 1530, the respective best result is then detected for each CP partial path 141, 144, 242, 1020, 1030, 1050, 1410 using the aforementioned methods. The aforementioned methods already include the check whether limits are exceeded or fallen short of. Should a method be used which does not include this verification, it can be subsequently performed here. If during verification it is detected that the limits cannot be adhered to under the applicable movement parameters in the respective iteration, a new iteration is started with a changed, i.e. increased, velocity.

In other words, in step 1530, if the path type of at least one of the partial paths is a geometrically spatially defined partial path 141, 144, 242, 1020, 1030, 1050, 1410, a time-optimal trajectory is calculated for each of the geometrically spatially defined partial paths according to one or more of the methods for calculating geometrically spatially defined partial paths in consideration of the predetermined limits and the applicable path and movement parameters, and the best result of the method is selected for the respective partial path.

Subsequently, in step 1540, the respective best result is detected for each PTP partial path 142, 143, 241, 243, 910, 1420 using the aforementioned methods. The aforementioned methods already include the check whether limits are exceeded or fallen short of. Should a method be used which does not include this verification, it can be subsequently performed here. If during verification it is detected that the limits cannot be adhered to under the applicable movement parameters in the respective iteration, a new iteration is started with a changed, i.e. increased, velocity.

In other words, in step 1540, if the path type of at least one of the partial paths is a geometrically spatially free partial path 142, 143, 241, 243, 910, 1420, a time-optimal trajectory is calculated for each of the geometrically spatially free partial paths according to one or more of the methods for calculating geometrically spatially free partial paths in consideration of the predetermined limits and the applicable path and movement parameters, and the best result of the method is selected for the respective partial path.

In step 1550, it is then ascertained whether the travel time of the entire path consisting of the travel times of the partial paths determined in steps 1530 and 1540 is the fastest travel time thus far. Should the current travel time be the thus far fastest travel time, this is saved or otherwise recorded in step 1560 together with the movement parameters required for travelling along the path and the resulting control commands for the industrial robot 100, 200. Furthermore, it is determined whether all limits are also adhered to for the entire path. The next iteration with increased velocity is then initiated.

A slower travel time is discarded and a new iteration with increased velocity is then immediately initiated.

In other words, in step 1550 the detected time-optimal trajectories for all partial paths are combined into an overall trajectory and a check is performed to make sure that the overall trajectory does not exceed the predetermined limits and allows the thus far fastest movement along the path. One of the movement parameters is then varied and a new iteration begun.

Should the previously determined final velocity $v_{max}$ be reached in any step, no further new iterations are subsequently performed. Together with the movement parameters required for travelling along the path and the resulting control commands for the industrial robot 100, 200, the most recently detected fastest travel time is forwarded to a second cycle 1600 as a result, as described above. Alternatively, the result can also be issued or forwarded to a control device for an industrial robot 100, 200.

In other words, following completion of the predetermined number of repetitions, the fastest overall trajectory is output as the time-optimal trajectory for movement along the path.

The second cycle 1600, i.e. the v-a-iteration, is, as already mentioned, shown in FIG. 16 and represents a computer-implemented method for determining a time-optimal trajectory before the start of movement for a movement of an industrial robot 100, 200 predefined by movement parameters on a path defined by path parameters which have at least a start point 121, 1010 and an end point 122, 1040 and comprise at least one path type, in compliance with predetermined limits.

On the basis of the result of the first cycle 1500, the acceleration $a_{iter}=a_{min} \ldots a_{max}$ is varied therein. The velocity $v_j$ can thereby also be adjusted, i.e. increased or reduced. The iteration occurs via n steps here as well. That means that with each cycle of the process, the acceleration $a_j$ value is increased in an alternating manner in terms of the sign.

More specifically, in step 1610 $v_j$ is initialised as per the respective best result of the first cycle 1500 and $a_j$ is initialised as zero. In step 1620, the acceleration is then increased such that $a_j=a_{iter}$(j). Where necessary, $v_j$ is increased or reduced by a certain delta dv(i). For instance, the increase or reduction can be made by a value between 15 and 30 percent of the velocity detected for the best travel time in the first cycle. In step 1630, the respective best result is then detected for each CP partial path 141, 144, 242, 1020, 1030, 1050, 1410 using the aforementioned methods. The aforementioned methods already include the check whether limits are exceeded or fallen short of. Should a method be used which does not include this verification, it can be subsequently performed here. If during verification it is detected that the limits cannot be adhered to under the applicable movement parameters in the respective iteration, a new iteration is started with a changed, i.e. increased, acceleration and where necessary with modified velocity.

In other words, in step 1630, if the path type of at least one of the partial paths is a geometrically spatially defined partial path 141, 144, 242, 1020, 1030, 1050, 1410, a time-optimal trajectory is calculated for each of the geometrically spatially defined partial paths according to one or more of the methods for calculating geometrically spatially defined partial paths in consideration of the predetermined limits and the applicable path and movement parameters, and the best result of the method is selected for the respective partial path.

Subsequently, in step 1640, the respective best result is detected for each PTP partial path 142, 143, 241, 243, 910, 1420 using the aforementioned methods. The aforementioned methods already include the check whether limits are exceeded or fallen short of. Should a method be used which does not include this verification, it can be subsequently performed here. If during verification it is detected that the limits cannot be adhered to under the applicable movement parameters in the respective iteration, a new iteration is started with a changed, i.e. increased, acceleration and where necessary with modified velocity.

In other words, in step 1640, if the path type of at least one of the partial paths is a geometrically spatially free partial path 142, 143, 241, 243, 910, 1420, a time-optimal trajectory is calculated for each of the geometrically spatially free partial paths according to one or more of the methods for calculating geometrically spatially free partial paths in consideration of the predetermined limits and the applicable path and movement parameters, and the best result of the method is selected for the respective partial path.

In step 1650, it is then ascertained whether the travel time of the entire path consisting of the travel times of the partial paths determined in steps 1630 and 1640 is the fastest travel time thus far. Should the current travel time be the thus far fastest travel time, this is saved or otherwise recorded in step 1660 together with the movement parameters required for travelling along the path and the resulting control commands for the industrial robot 100, 200. Furthermore, it is determined whether all limits are also adhered to for the entire path. Thereafter, the next iteration with increased acceleration and where necessary modified velocity is initiated.

A slower travel time is discarded and a new iteration with increased acceleration and where necessary modified velocity is then immediately initiated.

In other words, in step 1650 the detected time-optimal trajectories for all partial paths are combined into an overall trajectory and a check is performed to make sure that the overall trajectory does not exceed the predetermined limits and allows the thus far fastest movement along the path. One or more of the movement parameters is then varied and a new iteration begun.

Should the previously determined final acceleration $a_{max}$ be reached in any step, no further new iterations are subsequently performed. Together with the movement parameters required for travelling along the path and the resulting control commands for the industrial robot 100, 200, the most recently detected fastest travel time is issued as a result or forwarded to a control device for an industrial robot 100, 200.

In other words, following completion of the predetermined number of repetitions, the fastest overall trajectory is output as the time-optimal trajectory for movement along the path.

For each of the cycle types outlined above, i.e. v-iteration and v-a-iteration, the methods for calculating geometrically spatially defined partial paths 141, 144, 242, 1020, 1030, 1050, 1410 can come from the following group: method for optimising a route parameter in the time range and method for optimising a route parameter in the velocity range.

Likewise, the methods for calculating geometrically spatially free partial paths 142, 143, 241, 243, 910, 1420 can be selected from the following group: bang-bang trajectory, in particular 7-phase trajectory and mean filtered rectangle trajectories in acceleration, and synchronisation trajectory, in particular spline paths and polynomial trajectories.

As described above, the method according to the invention can be applied to any entire paths. It is hereby irrelevant whether the entire path has at least one geometrically spatially defined partial path 141, 144, 242, 1020, 1030, 1050, 1410, at least one geometrically spatially free partial path 142, 143, 241, 243, 910, 1420, and/or at least one geometrically spatially defined partial path 141, 144, 242, 1020, 1030, 1050, 1410 and one geometrically spatially free partial path 142, 143, 241, 243, 910, 1420.

The path parameters which define the entire path can comprise grid points 131, 132, 133, 213, 232, 1210, 1310 which represent connection points of two partial paths or points within one or more paths.

The movement parameters which define the robot's 100, 200 movement on the path can hereby comprise velocity and/or acceleration values. The movement parameters can also comprise values which are to be applicable at the grid points 131, 132, 133, 213, 232, 1210, 1310, the start point 121, 1010 and/or the end point 122, 1040.

Furthermore, the path parameters can comprise further grid points 131, 132, 133, 213, 232, 1210, 1310, further path types of partial paths, and/or a maximum velocity of partial paths.

As described above, the embodiment according to the invention can comprise a dual cycle of the performance of a predetermined number of repetitions of the method steps. During the first cycle, when varying one or more of the movement parameters only the velocity movement parameter can be varied, and during the second cycle when varying one or more of the movement parameters the acceleration and velocity movement parameters can be varied.

The limits can, for instance, describe physical limits which must not be exceeded or fallen short of in one or more of the joints and/or drive axles of the industrial robot 100, 200.

Furthermore, the limits can also comprise position limits, that is to say areas in which the TCP 110, 210 and/or other parts of the robot 100, 200 are allowed to be during the movement. The limits can also comprise an acceleration value, a jerk value, an axle velocity value and/or a motor torque value for one or more of the axles of the robot 100, 200. The path velocity on the entire path or one or more partial paths can also be defined as a limit.

FIG. 17 shows a target amendment procedure via an output path 1710 whose geometry is adjusted. With 'pick-and-place' paths, it is common that the target position 1730 can vary due to the position of parts in each system cycle. That means the robot 100, 200 has to place each part in a slightly different place 1730. Similarly, the start position at which the piece is to be picked up can be changed accordingly. To accomplish the change of a position, one (or more) output path(s) 1710 is/are saved in a memory. The geometry is then amended such that an adjusted path 1720 is generated and the time information of the output path is used again. FIG. 17 shows two adjusted paths 1720. One in which the x value has to be increased, and one in which the x value has to be reduced.

A further embodiment according to the invention is a device, preferably a computer, for the determination of a time-optimal trajectory before the start of movement for a movement of an industrial robot 100, 200 predefined by movement parameters on a path defined by path parameters which have at least a start point 121, 1010 and an end point 122, 1040 and comprise at least one path type, in compliance with predetermined limits, wherein the device is configured to perform a method according to one of the preceding patent claims.

For this purpose, the device comprises a calculation unit which is configured to divide the path into one or more partial paths.

The calculation unit is further configured to calculate a time-optimal trajectory for each of the partial paths in consideration of the predetermined limits and the applicable path and movement parameters by using methods for calculating geometrically spatially defined and/or free partial paths, and to select the best result for each partial path.

The calculation unit is further configured to merge the time-optimal trajectories for all partial paths into an overall trajectory.

The calculation unit is further configured to check whether the overall trajectory or the trajectory of a partial path exceeds the predetermined limits, and to detect whether the detected overall trajectory allows the thus far fastest movement along the path.

The calculation unit is further configured to vary one or more of the movement parameters.

The calculation unit is further configured to output the fastest overall trajectory as the time-optimal trajectory for the movement along the path.

A further embodiment is a computer program product with a program for a data processing device, comprising software code sections for performing the steps according to the aforementioned method if the program is run on the data processing device. This computer program product can comprise a computer-readable medium upon which the software code sections are saved, wherein the program can be loaded directly into an internal memory of the data processing device.

The example embodiments show possible embodiment variations, although it is to be noted here that the invention is not limited to the specifically represented embodiment variations of the same, but rather various combinations of the individual embodiment variations with one another are possible, and that given the technical teachings provided by the present invention this variation possibility is within the ability of the skilled person in this technical field.

The scope of protection is defined by the claims. The description and the drawings should, however, be consulted when construing the claims.

Individual features or combinations of features from the various example embodiments as shown and described can constitute separate inventive solutions. The problem to be solved by the individual inventive solutions can be derived from the description.

All value ranges specified in the current description are to be understood such that they include any and all sub-ranges, e.g., the specification 1 to 10 is to be understood such that all sub-ranges, starting from the lower limit 1 and the upper limit 10 are included, i.e., all sub-ranges begin with a lower limit of 1 or more and end at an upper limit of 10 or less, e.g., 1 to 1.7, or 3.2 to 8.1, or 5.5 to 10.

As a matter of form and by way of conclusion, it is noted that, to improve understanding of the structure, elements in the figures have partially not been shown to scale and/or enlarged and/or shrunk.

LIST OF REFERENCE NUMERALS

100, 200 Robot
110, 210 Tool centre point
121, 1010 Start point
122, 1040 End point
131, 132, 133, 213, 232, 1210, 1310 Grid points
141, 144, 242, 1020, 1030, 1050, 1410 CP-type partial paths
142, 143, 241, 243, 910, 1420 PTP-type partial paths
410 Impulse response
801 Data input
802 Limit specification
803 Determination of a 7-phase trajectory per axle
804 Detection of the slowest axle
805 Stretches with 7-phase trajectory
806 Verification
807 Calculation of spline path
808 Verify if limit reached
809 Abort
810 Dynamic reduction
811 Verify if motor torque limit reached

812 Reduce limits
813 End of calculation
920 Position limit
1051, 1052 Route parameter
1220, 1230 Iteration for position parameter
1250, 1260 Iterations for velocity parameter
1330, 1340 Iterations for velocity parameter
1350 Limit curve for the velocity parameter
1500, 1600 Method according to the invention, in the first or second cycle
1510, 1610 Initialisation of start values
1520, 1620 Variation of movement parameters
1530, 1540, 1630, 1640 Calculation of time-optimal trajectories for CP and PTP paths
1550, 1650 Merging of trajectories and checking of limits
1560, 1660 Checking for fastest time and where applicable saving of a fastest result
1710 End path
1720 Adapted paths
1730 Amended target position

The invention claimed is:

1. A computer-implemented method for controlling an industrial robot by determining a time-optimal trajectory before a start of movement for a movement of the industrial robot predefined by movement parameters on a path defined by path parameters which have at least a start point and an end point and comprise at least one path type, in compliance with predetermined limits, the method comprising the steps of:

dividing the path into one or more partial paths comprising a geometrically spatially defined partial path and a geometrically spatially free partial path;

performing a predetermined number of repetitions of the following steps:

for the geometrically spatially defined partial path, calculating a time-optimal trajectory for each of the geometrically spatially defined partial paths according to one or more methods for calculating geometrically spatially defined partial paths in consideration of the predetermined limits and applicable path and movement parameters, and selecting the best result of the methods for the respective partial path;

for the geometrically spatially free partial path, calculating a time-optimal trajectory for each of the geometrically spatially free partial paths according to one or more methods for calculating geometrically spatially free partial paths in consideration of the predetermined limits and applicable path and movement parameters, and selecting the best result of the methods for the respective partial path;

merging the time-optimal trajectories for all of the geometrically spatially defined partial paths that are selected as the best result of the methods for the respective partial paths and for all of the geometrically spatially free partial paths that are selected as the best result of the methods for the respective partial path into one overall trajectory;

checking that the overall trajectory does not exceed the predetermined limits and allows the thus far fastest movement along the path;

varying one or more of the movement parameters for the geometrically spatially defined partial path and for the geometrically spatially free partial path;

following completion of the predetermined number of repetitions, outputting the fastest overall trajectory to a robot control device for the industrial robot as the time-optimal trajectory for movement along the path; and moving the industrial robot along the time-optimal trajectory using the robot control device.

2. The method according to claim 1, wherein the method for calculating geometrically spatially defined partial paths is selected from the following group: a method for optimising a route parameter in a time range and a method for optimising a route parameter in a velocity range.

3. The method according to claim 1, wherein the partial paths comprise at least one of a geometrically spatially defined partial path, a geometrically spatially free partial path and a geometrically spatially defined partial path and a geometrically spatially free partial path.

4. The method according to claim 1, wherein the path parameters further comprise grid points which represent connection points of two partial paths or points within one or more paths.

5. The method according to claim 1, wherein the movement parameters comprise velocity and/ or acceleration values, and/or wherein the movement parameters comprise values which are to be applicable at grid points, the start point and/or the end point; and/or wherein the path parameters comprise one or more grid points, further path types of partial paths, and a maximum velocity of partial paths.

6. The method according to claim 1, further comprising a dual cycle of a performance of a predetermined number of repetitions of the method steps, wherein during a first cycle, only a velocity movement parameter is varied when varying one or more of the movement parameters, and wherein during a second cycle, acceleration and velocity movement parameters are varied when varying one or more of the movement parameters.

7. The method according to claim 1, wherein the limits describe physical limits which must not be exceeded or fallen short of in one or more joints and/or drive axles of the industrial robot.

8. The method according to claim 1, wherein the limits comprise one or more of the following values: a position, an acceleration, a jerk, axle speed per axle of the industrial robot, a motor torque per axle of the industrial robot, and a path velocity.

* * * * *